(12) United States Patent
Langford

(10) Patent No.: US 8,161,565 B1
(45) Date of Patent: Apr. 17, 2012

(54) KEY RELEASE SYSTEMS, COMPONENTS AND METHODS

(75) Inventor: Glenn Langford, Kanata (CA)

(73) Assignee: Entrust, Inc., Dallas, TX (US)

( * ) Notice: Subject to any disclaimer, the term of this patent is extended or adjusted under 35 U.S.C. 154(b) by 3483 days.

(21) Appl. No.: 09/746,015

(22) Filed: Dec. 26, 2000

(51) Int. Cl.
*H04L 9/08* (2006.01)
*G06F 7/04* (2006.01)

(52) U.S. Cl. .................................. 726/30; 380/278

(58) Field of Classification Search .............. 380/278; 713/200, 201
See application file for complete search history.

(56) References Cited

U.S. PATENT DOCUMENTS

| | | | | |
|---|---|---|---|---|
| 5,481,613 A | * | 1/1996 | Ford et al. | 380/30 |
| 5,612,683 A | * | 3/1997 | Trempala et al. | 340/5.23 |
| 5,828,832 A | * | 10/1998 | Holden et al. | 713/201 |
| 6,393,568 B1 | * | 5/2002 | Ranger et al. | 713/188 |

OTHER PUBLICATIONS

"A Key Distribution Method for Object-Based Protection", Warwick Ford and Michael J. Wiener, Bell-Northern Research, Ottawa, Canada, pp. 193 to 197.
"Protecting Digital Content—Using the Intel Software Integrity system", Intel Corporation, 5200 N.E. Elam Young Parkway, Hillsboro, OR 97124-6497, pp. 1 to 11.

* cited by examiner

*Primary Examiner* — Kaveh Abrishamkar

(57) ABSTRACT

Systems, methods, components are provided all for the purpose of controlling access to decryption keys needed to decrypt ciphertext. A key release agent is provided which controls decryption key distribution. The key release method starts with receiving an encrypted key, key related information and decryptor information from a decryptor and determining a whether a private key corresponding to the key ciphertext is available. Upon determining the private key corresponding to the key ciphertext is available, a decision is made based on decryptor information of the decryptor and the key related information whether decryption of the key ciphertext is to be permitted. Decryptors adapted to participate with the KRA in the above described key distribution methods are also provided.

23 Claims, 5 Drawing Sheets

| ACCESS IDENTIFIER (90) | KEY PAIR IDS (92) | PRIVATE KEYS (93) |
|---|---|---|
| 94 ⌐ LEGAL TEAM | ID-PKa, ID-PKb, ID-PKc, ID-PKd | RKa, RKb, RKc, RKd |
| 96 ⌐ R&D TEAM | ID-PKe, ID-PKf, ID-PKg, ID-PKh | RKe, RKf, RKg, RKh |
| ⋮ | ⋮ | |

| ACCESS IDENTIFIER (90) | RULES (102) |
|---|---|
| LEGAL TEAM | RULE1, RULE2 |
| R&D TEAM | RULE1, RULE3 |
| ⋮ | ⋮ |

KEY RELEASE SYSTEMS, COMPONENTS AND METHODS

FIELD OF THE INVENTION

The present invention relates generally to key release systems, components and methods for use in computer networks in which cryptographic techniques are used for data confidentiality purposes, through which access to encrypted data is controlled by controlling who has access to keys used to encrypt the data.

BACKGROUND OF THE INVENTION

Cryptographic techniques constitute a major building block used in implementing security services in computer networks. The basic function provided by a cryptographic system (or cryptosystem) is encipherment/decipherment. A cryptosystem comprises a pair of data transformations, encryption and decryption, respectively. Encryption is applied to a data item, known as plaintext, to generate a new (unintelligible) data item, ciphertext. Decryption, applied to ciphertext, results in the regeneration of the original plaintext. An encryption transformation uses as input both the plaintext data and an independent data value known as an encryption key. Similarly, a decryption transformation uses a decryption key. There are two basic types of cryptosystems, namely symmetric systems and public key (or asymmetric) systems. In symmetric cryptosystems the same key is used in the encryption and decryption transformations. A public key system has a key pair comprising a public key and a private key. One of these keys is used for encryption and the other for decryption. The public key does not need to be kept confidential.

To provide data confidentiality, a symmetric cryptosystem works as follows. Two parties, A and B, want to communicate securely. By some process (e.g., by a secure channel or a trusted courier), they both obtain knowledge of a data value to be used as a key. The key is kept secret from all parties other than A and B. This enables either A or B to protect a message sent to the other party by encrypting it using the shared key. The other party can decrypt the message, but outside parties cannot.

In a public key cryptosystem there are two basic modes of operation, an encryption mode and an authentication mode. In the encryption mode, the data originator uses the public key for encryption and the recipient uses the private key of the same key pair for decryption. In this system, knowledge of the public key is not enough to deduce the private key. Therefore, the encryptor knows that data encrypted with a public key can only be decrypted by the holder of the corresponding private key. It is also possible to authenticate the encryptor in the authentication mode of operation. In this mode, the encryptor sends ciphertext encrypted by the private key of the key pair. The decryptor (recipient) then knows that data encrypted with the private key can be decrypted by anyone but could only have been sent by the holder of the private key. A cryptosystem of this kind which can operate in both encryption and authentication modes is known as a reversible public key cryptosystem.

Cryptographic techniques all depend upon cryptographic keys. The keys must be made known in advance (distributed) to the parties that will use them and at the same time they must be protected as necessary against disclosure and/or substitution. Therefore key management, particularly key distribution, is very important. With purely symmetric systems, if the number of keys in a network is to be kept manageable, it is necessary to use trusted key centers for key distribution. For any two systems to communicate securely, they must share a master keying relationship with a key center. Furthermore, that key center must be on-line at the time secure communications are to be established. Distribution of public keys is simpler and does not require trusted on-line servers. Distribution of a public key does not require confidentiality, but it does require integrity to the extent that the user of a public key must be assured that it is the correct public key for the remote party concerned. For this reason, a public key is usually distributed in the form of a certificate which is digitally signed by a trusted certification authority. Certificates can then be distributed by unsecured means, such as a public directory service. A user of a certificate can be assured the certificate contents have not been changed, by verifying the certification authority signature. Installation of a new private/public key pair is straightforward; keys are typically generated within the owner system or a certification authority system. The only secure key transfer necessary is the transfer of one key from either the owner system to the certification authority system, or vice versa. These two systems are usually in the same network, and are typically close to one another.

In comparison with symmetric cryptosystems, public key systems have the advantage of simpler key distribution. However, countering this advantage, symmetric systems have the advantage of lower processing overheads. This makes symmetric systems particularly attractive for the bulk encryption/decryption of large volumes of data.

To benefit from all the advantages, a hybrid approach may be used. Symmetric cryptosystems are used for protecting bulk data and public key systems are used for distributing the symmetric keys (primary keys). For example, if a party A wants to establish a symmetric encryption key with party B, using the RSA algorithm, it can do so as follows. Party A obtains a copy of party B's public key by obtaining the necessary certificate (possibly sent directly from Party B) and checking the certificate signature (or the signatures on a chain of certificates) to ensure the key is valid. Party A then generates a random symmetric key, and sends it to Party B, encrypted under Party B's public key. Only Party B can learn the symmetric key value, as only Party B knows the private key needed to decipher the message (the encrypted symmetric key value). Hence the two parties establish shared knowledge of the symmetric key, and can use it for protecting data communicated between them.

In the traditional encryption key distribution method, all message recipients have key pairs of a reversible public key cryptosystem (such as RSA). The message is encrypted using a symmetric cryptosystem, and copies of the encryption key, encrypted under the public key of each recipient, are attached to the message. Each legitimate recipient can recover the encryption key by decrypting the applicable copy of it with his private key. This method has several shortcomings. Firstly, the only access control model it can support is a simple list of authorized decryptors and the list of authorized decryptors is fixed at the time of content encryption; other models are often required, such as specifying group membership, role membership, or security clearance. Secondly, when there is a large number of recipients, the overhead of all the encrypted symmetric keys can be significant. Thirdly, the encrypting system must obtain and verify, for every authorized recipient, a public key certificate; this can be a lengthy process, given the need to process multiple certificate chains and revocation lists.

An existing solution is taught in U.S. Pat. No. 5,481,613 to Ford et al. which issued Jan. 2, 1996 entitled "Computer Network Cryptographic Key Distribution System" hereby incorporated by reference in its entirety. That solution uses ACD (access controlled decryption) blocks which travel with the data ciphertext, and which contain rules which can be applied to decryptor information to determine whether decryption is to be authorized or not.

SUMMARY OF THE INVENTION

Systems, methods, components are provided all for the purpose of controlling access to decryption keys needed to decrypt ciphertext.

One broad aspect of the invention provides a key release agent and corresponding methods which controls decryption key distribution. The key release method starts with receiving an encrypted key, and key related information. Decryptor information in respect of the decryptor is obtained. A decision is made based on decryptor information of the decryptor and the key related information whether decryption of the key ciphertext is to be permitted.

In one embodiment, the decryptor information is received together with the key ciphertext and key related information. Alternatively, the decryptor information may be received while establishing a secure connection with the decryptor. Alternatively, receiving decryptor information may involve receiving from the decryptor a decryptor identifier, and using the decryptor identifier to lookup decryptor attributes from a public repository, the decryptor identifier and decryptor attributes together constituting the decryptor information. This might for example involve using information in a certificate as the decryptor information. The decryptor information might be an identity or role of the decryptor, an alias, or a claim of access rights or privilege, or some attribute of the decryptor or the decrypting device or platform.

The key related information allows an identification of the key which was used to encrypt the key. This might for example be a key pair identifier.

Some embodiments further comprise decrypting the key ciphertext, re-encrypting the key using a public key of a {public key, private key} pair to produce a re-encrypted key, the private key of which is available to the decryptor, and sending the re-encrypted key to the decryptor. In another embodiment, the decryption key is sent to the decryptor over a secure channel.

In another embodiment, the method is adapted to handle the receipt of a plurality of key ciphertexts and respective key related information from the decryptor. A decision is made based on the decryptor information whether decryption of at least one of the plurality of key ciphertexts is to be permitted.

In some embodiments, deciding based on decryptor information of the decryptor and the key related information whether decryption of at least one of the key ciphertexts is to be permitted involves applying decryptor authorization logic associated with each public key used to encrypt the decryption key. The decryptor authorization logic is applied to the decryptor information to determine whether the decryptor should be permitted access to the decryption key.

The invention in accordance with another broad aspect provides a method of controlling access to decryption keys. This involves maintaining a private key repository comprising a plurality of access identifiers, and for each access identifier at least one key related information of a respective {public key, private key} pair, the repository also containing the private key of each {public key, private key} pair, and maintaining a decryptor authorization logic repository comprising for each access identifier a decryptor authorization logic, for example a set of one or more rules, which can be applied to a decryptor information. Decryptor information is obtained, either in a key release request, or through some other means. A key release request is received containing a decryption key encrypted using a public key of a {public key, private key} pair and containing a key related information associated with the {public key, private key} pair. The private key repository is consulted to determine if the key related information in the key release request is stored in association with any access identifiers. For each access identifier in association with which the key related information is stored, the decryptor authorization logic is applied to the decryptor information specified in the key release request. In the event the decryptor information satisfies at least one of the decryptor authorization logics, the ciphertext is decrypted to recover the decryption key, and a key release response is sent to the decryptor specifying the decryption key.

Other embodiments of the invention provide decryptors and decryptor methods which are adapted to make requests to the above described key release agent/method in order to obtain decryption key.

In accordance with a broad aspect of the invention, one such method for a decryptor to obtain a decryption key from a key release agent starts with the decryptor obtaining an encryption block comprising a data ciphertext requiring a decryption key to decrypt, the encryption block further comprising key related information associated with a first {public key, private key} pair, the encryption block further comprising a key ciphertext consisting of the decryption key encrypted by the first public key of the first {public key, private key} pair. The encryption block does not contain an ACD block. The decryptor needs to make the decryptor information available to the key release agent, either in a key release request or through some other means. The decryptor then generates a key release request containing the key ciphertext, and the key related information and outputs the key release request to the key release agent. The decryptor then receives a key release response specifying the decryption key, assuming that it has been granted permission to have the decryption key.

Usually, the decryptor then uses the decryption key to decrypt the data ciphertext.

In some embodiments, before generating the key release request, the decryptor determines if the private key of the first {public key, private key} pair is available at the decryptor. Upon determining the private key of the first {public key, private key} pair is not available at the decryptor, the key release request is generated.

In the event the decryption key is specified in an encrypted form, the method further involves decrypting at least a portion of the key release response containing an encrypted version of the decryption key using a private key of a second {public key, private key} pair to recover the decryption key.

The encryption block may in some cases contain more than one key related information associated with a respective plurality of first {public key, private key} pairs, and key ciphertexts each consisting of the decryption key encrypted by the public key of a respective one of the first {public key, private key} pairs associated with one of the key related informations. In such a case, the key release request is generated containing the key ciphertexts, the key related informations.

Another embodiment of the invention provides an administrative interface having a private key repository maintenance function adapted to allow adding and deleting of a key related information and associated private key of a {public key, private key} pair, and a decryptor authorization logic definition function adapted to allow the definition of decryptor authorization logics to be applied to decryptor information to determine eligibility to decrypt, and for each decryptor authorization logic to select one or more of the key related information in respect of which the decryptor authorization logic is to be applied.

Advantageously, these solutions allow the specification long after the act of encryption, or who is allowed to decrypt the content. These solutions are also highly scalable compared to encrypting exhaustively for each desired recipient. The solutions are also transparent to the encryptor, and allow the encryptor to specify individual recipients, or groups of recipients in any combination.

BRIEF DESCRIPTION OF THE DRAWINGS

Preferred embodiments of the invention will now be described with reference to the attached drawings in which:

FIG. 5 is an example structure of the private key repository of FIG. 4;

FIG. 6 is an example structure of the rules repository of FIG. 4; and

DETAILED DESCRIPTION OF THE PREFERRED EMBODIMENTS

Figure 1:
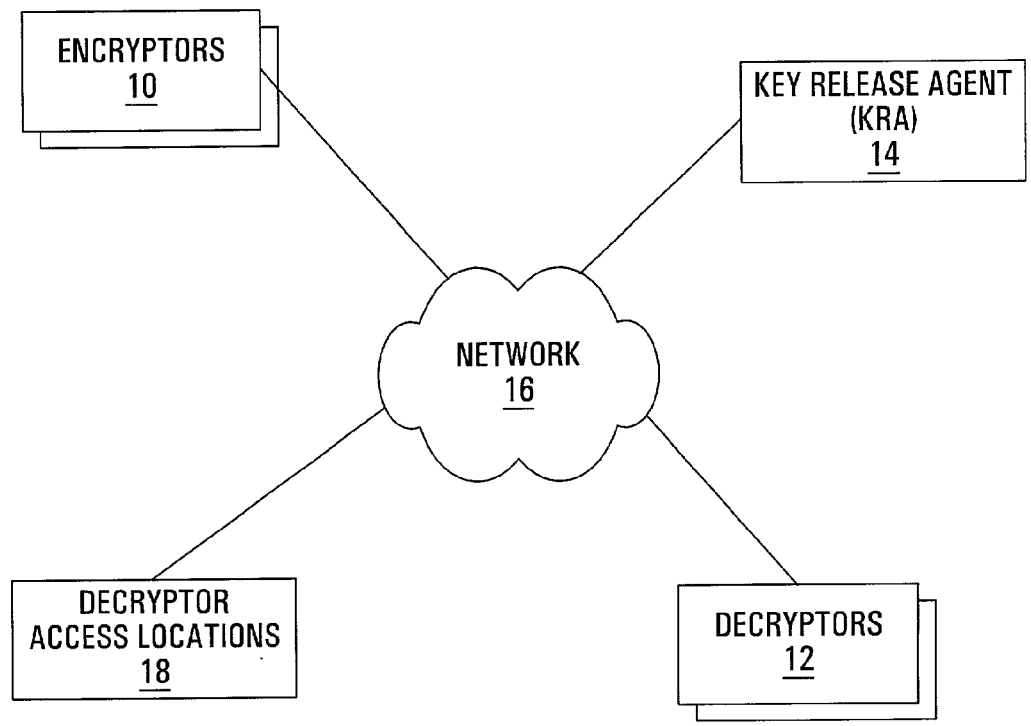
FIG. 1 is a block diagram of a cryptosystem provided by an embodiment of the invention.

Referring firstly to FIG. 1, shown is a cryptosystem provided by an embodiment of the invention. The cryptosystem consists of one or more encryptors 10, one or more decryptors 12, and a KRA (key release agent) 14. An "encryptor" is any combination of one or more devices and/or software which together are capable of performing encryption operations. Similarly, a "decryptor" is any combination of one or more devices and/or software which together are capable of performing decryption operations. The encryptors 10 and decryptors 12 are shown connected to a generic network cloud 16 to indicate complete flexibility as to how they interact physically. The encryptors 10 encrypt a plaintext as described below to produce a respective encryption block, and either send this directly to one or more decryptors 12, or to a decryptor access location 18 accessible by one or more decryptors 12. The decryptors 12 attempting to decrypt an encryption block do so with the assistance of the KRA 14 as described in detail below.

Figure 2:
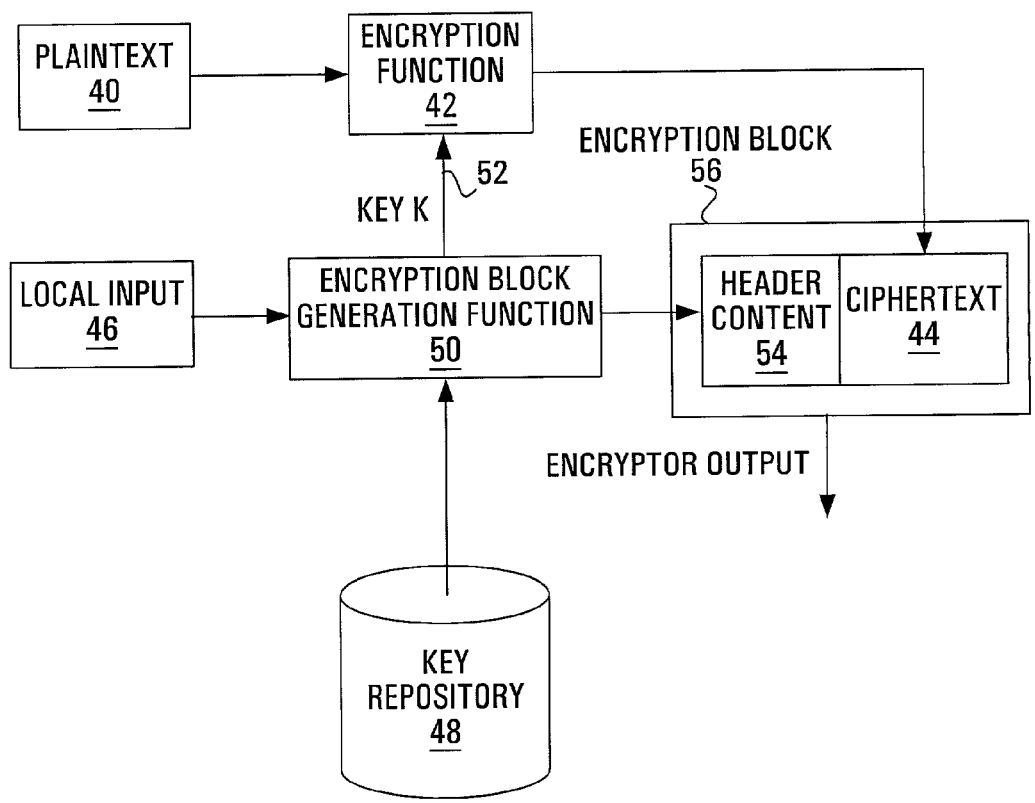
FIG. 2 is a block diagram of the encryptor of FIG. 1.

FIG. 2 is a functional schematic diagram of an encryptor (encryptor 10 of FIG. 1) according to one embodiment of the present invention. The encryptor has a plaintext input 40, fed to an encryption function 42 the output of which is a ciphertext portion 44 of the encryption block 56. Inputs from a local input 46 and a key repository 48 (preferably a public key repository) are fed to an encryption block generation function 50 having a first output 52 consisting of a symmetric message encryption key K for use by the encryption function 42 and header content 54 for use in the header portion of the encryption block 56. The encryption block does not contain an ACD block as contemplated in the above referenced U.S. Pat. No. 5,481,613.

In operation, the encryptor 10 receives the local input 46 through which one or more key pair identifiers are determined. The encryptor does this by specifying one or more recipients and/or one or more access identifiers. The encryptor 10 has access (local and/or remote) to all required keys through the key repository 48. The encryption block generation function 50 generates the symmetric message encryption key K 52 for the particular encryption operation, and generates header content 54 (which may constitute the entire header or a portion of the header) the details of which are provided below. The plaintext 40 to be confidentiality-protected is encrypted by the encryption function 42 to produce a ciphertext 44 in a symmetric cryptosystem using the key K. As a function of the local input 46, the encryptor obtains through the key repository 48 one or more key release public keys (PK1, ..., PKN). Each key release public key PKi (i=1, ... N) comes with a respective key pair identifier (ID-PKi) for the {public key, key-release R key} pair consisting of {PKi, RKi} and optionally verifies the signature on the applicable key certificate. Stated more clearly, the key release private key (RKi) and the key release public key (PKi) form a key release key pair which is a key pair of a public-key cryptosystem. Each PKi is respectively used to encrypt the message encryption key K. The ciphertext versions of the encryption key K and the key pair identifiers of the public keys used constitute the header content 54. The ciphertext 44 and header content 54 together are combined as an encryption block 56 which is sent to decryptor access locations which may be specific decryptors, or may be any location accessible to decryptors, such as e-mail, file or application servers, or any location with direct or indirect network connectivity to a decryptor.

The key release public keys PKi are available to encrypting systems (encryptors) through the key repository 48 and used by them in encrypting the message encryption key K, while the key release private keys (PKi) are made known only to authorized key release agents (KRA) as described in further detail below.

Each RKi is a private key of a key-release key pair and is held by a trusted component called a KRA (key release agent). This may, for example, be a network component such as a server. Each KRA holds a copy of each R key used in a secure manner (e.g., in a hardware cryptomodule). Copies, preferably certified, of the corresponding key-release public keys are made available to encryptors in the key repository 48. The KRA will also be described in detail below.

The ciphertext 44 and header content 54 consisting of the message encryption key K encrypted using each of the public keys PKi, and the {PKi,RKi} pair identifier ID-PKi are sent to the decryptor access locations. As they can be made freely accessible to any party, they can be sent through a nonsecured electronic mail system or by posting them on a public file server, or by posting them publicly on the Internet or on some other open network.

Figure 3:
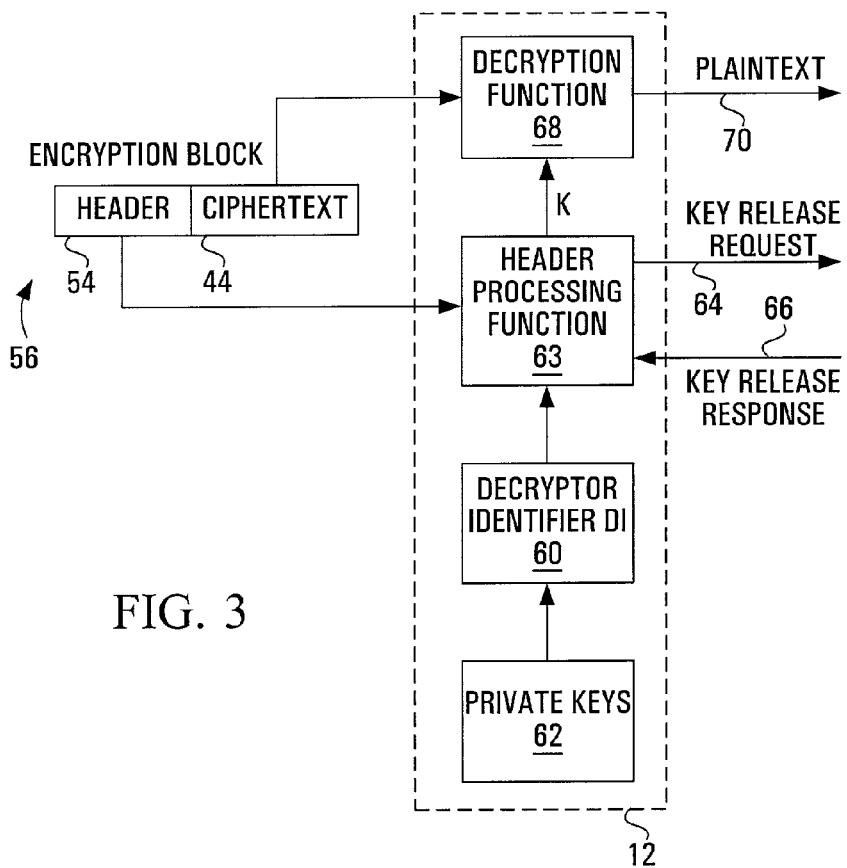
FIG. 3 is a block diagram of the decryptor of FIG. 1.

FIG. 3 is a functional schematic diagram of a decryptor 12 provided by an embodiment of the invention. The decryptor has an input through which it receives an encryption block 56, consisting of the ciphertext 44 and the header 54. The decryptor has a decryptor identifier DI 60 stored locally which identifies the decryptor. In a preferred embodiment, the decryptor identifier is all or a portion of the decryptor's Distinguished Name from the decryptor's certificate. The decryptor also has its own set of one or more private keys 62. A header processing function 63 processes the header 54 and coordinates obtaining the ability to decrypt the message encryption key K from the key release agent (not shown in FIG. 3). The decryptor is capable of sending key release requests 64 to the key release agent. The decryptor is also capable of receiving key release responses 66 from the key release agent. There is a decryption function 68 which can decrypt ciphertext 44 in the event that the required symmetric key K is made available in a key release response 66 from the key release agent. The overall output assuming successful decryption is plaintext 70.

In operation, the decryptor 12 receives an encryption block 56 for decryption. As mentioned previously, this may be received directly from an encryptor, or may be obtained from any other decryptor access location. The header 54 of the encryption block 56 contains the required decryption key encrypted using the respective private key of one or more {public key, private key} pairs, and contains key pair identifiers. In one embodiment, the decryptor first checks to see if it has the private key in its set of private keys 62 of at least one of the key pairs identified in the header 54 of the encryption block 56 in which case the decryptor can decrypt the decryption key without the need for assistance. In another embodiment, the decryptor always looks to the key release agent for assistance. The decryptor combines the decryptor identifier DI 60 with the encryption block header 54, and generates a key release request 64 which is sent to the KRA. In the event the KRA determines the decryptor 12 is authorized to perform the decryption, the decryptor 12 will receive the message encryption key K in a key release response 66. In one embodiment the key release response 66 contains the message encryption key K encrypted using the decryptor's public key in which case the decryptor then decrypts the key K using private key 62 to recover the plaintext message encryption key K, and uses this to decrypt the ciphertext 44 using decryption function 68.

Figure 4:
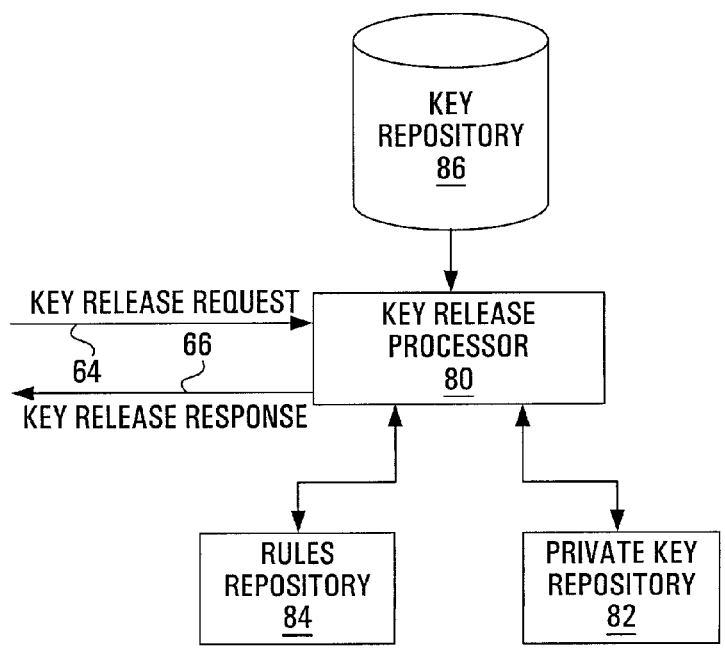
FIG. 4 is a block diagram of the key release agent of FIG. 1.

Referring now to FIG. 4 details of the KRA will now be described. The KRA has a key release processor 80 which receives key release requests 64 and generates key release responses 66. The key release processor 80 is connected to a private key repository 82, and a rules repository 84 (more generally a decryption authorization logic repository) and has access to a key repository 86 which may or may not be the same as key repository 48 of FIG. 2. The key repository 86 contains keys preferably digitally signed, and contains decryptor identifier (DI)→key mappings and may contain attribute certificates also digitally signed.

Referring to FIG. 5, the private key repository 82 has a mapping from access identifiers 90 to corresponding groups of one or more key pair identifiers 92 and associated private keys 93. For example, the access identifier "legal team" 94 is shown mapped to four public key pair identifiers PKa,PKb,PKc,PKd, and the access identifier "R&D team" 96 is shown mapped to four public key pair identifiers PKe,PKf,PKg,PKh. Typically, for a given access identifier, only one key pair is "current", the other key pair identifiers relating to older key pairs which may be expired. This is due to the fact that typically any key material will eventually expire, and a new key pair will be issued. Even though some old keys may have expired, one still wants to be able to decrypt older information that may have used them.

Each access identifier is associated with a set of rules (more generally, is associated with respective decryptor authorization logic) which effectively define the access identifier.

Referring to FIG. 6, the rules repository 84 contains one or more rules 102 associated with each access identifier 90. For example, the rules "rule1" and "rule2" are shown associated with the access identifier "legal team", and the rules "rule1", "rule3" are shown associated with the access identifier "R&D team".

Each rule is a condition which can be applied to an access identifier. A decryptor identifier which satisfies the rules of a given access identifier is said to belong to that access identifier. The rules can be applied in any suitable manner, for example by requiring at least one rule to be satisfied, or by requiring all or specific combinations of rules to be satisfied. The access identifier is a way of organizing the contents of the private key repository 82 and the rules repository 84. Ultimately what is provided is an association between sets of private keys and corresponding sets of rules. The KRA operates on the principle that for a given decryptor to be given access to a decryption key requiring a particular private key to decrypt, the decryptor's decryptor identifier must satisfy the rules associated with the particular private key.

The rules are capable of supporting the following types of access control policies (or a combination thereof):

individual-based policy: a list of names of individuals authorized to decrypt;

group-based policy: a list of names of groups of authorized individuals; the set of individuals constituting a particular group is maintained by one or more individuals specially authorized for this purpose;

role-based policy: a list of role identifiers; each role implies a set of attributes that a decryptor must possess (for example, in a banking environment, distinct roles might be "teller", "branch manager", "auditor", and "customer"). The roles of a given decryptor may be determined from its associated attribute certificates.

context-based controls, e.g., location of decryptor and/or time of day; and multi-level policy: the decryptor must have a clearance to a particular level, e.g., "unclassified", "confidential", "secret", and "top secret".

While the description above has referred to "rules" which are applied to determine whether a decryptor should be given authorization, more generally, any decryptor authorization logic can be applied. The important consideration is that the decryptor authorization logic is known by the KRA, is associated with particular keys, and the decryptor authorization logic is not specified in key release requests (described in further detail below).

Figure 7:
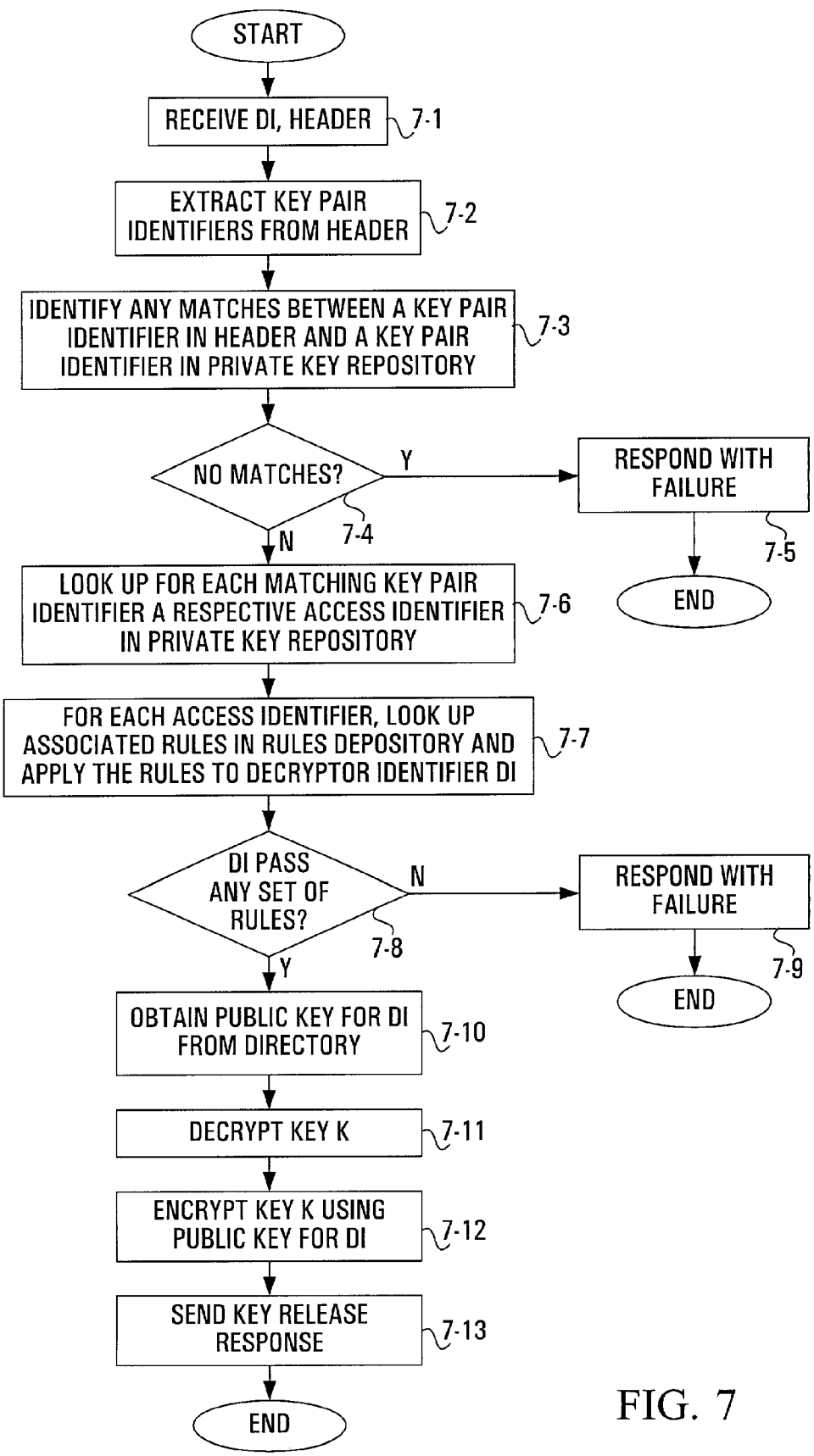
FIG. 7 is a flowchart of functionality implemented by the key release agent of FIG. 4.

The key release processor 80 is adapted to process key release requests 64 as detailed in the flowchart of FIG. 7 with further reference to FIGS. 4, 5 and 6. The process begins with the reception of a key release request containing the encryption block header, and containing the identifier DI of the decryptor (step 7-1). The key release processor 80 extracts the key pair identifiers from the header (step 7-2). The key release processor 80 then identifies any matches between a key pair identifier in the header and a key pair identifier in the private key repository 82 (step 7-3). In other words, for each key pair identifier in the header, the key release processor 80 searches the private key repository 82 to see if the key pair identifier is included in the repository. In the event there is no such match (yes path, step 7-4), the key release agent generates a failure key release response message 66 and returns this to the decryptor (step 7-5). In the event there is a match (no path, step 7-4), then for each matching key pair identifier 92, the respective access identifier 90 in the private key repository 82 is obtained (step 7-6). For each such access identifier 90, the rules repository 84 is consulted for the list of rules 102 to be applied in respect of the access identifier 90. The lists of rules are applied, one list at a time, to the decryptor identifier DI until a set of rules is passed (step 7-7). For example, if the search through the private key repository 82 returns three access identifiers, the rules for the first access identifiers are applied to DI, and if they pass, authentication is complete, and if they fail, the rules for the next access identifier are applied to DI and so on. In the event the decryptor identifier DI does not pass any of the sets of rules (no path, step 7-8), then the KRA responds with a key release response message indicating failure (step 7-9). Alternatively, if the decryptor identifier DI does pass a set of rules (yes path, step 7-8), then the decryption key is made available to the decryptor in a key release response (step 7-13). Optionally, this involves obtaining a public key for DI from the key repository (step 7-10). The message encryption key K is decrypted using a private key in the private key repository 82. This may be done using the private key corresponding with the public key associated with the group identifier whose set of rules the decryptor identifier DI passed, but more generally can be done using any private key corresponding with any public key included in the header. Preferably, the message encryption key K is then encrypted using the decryptor's public key (step 7-12) (this also being referred to as "re-encrypting" the encryption key for the decryptor to produce a re-encrypted key), and this is sent in a key release response to the decryptor (step 7-13).

In the above described embodiments, key pair identifiers have been used to identify {public key, private key} pairs. More generally, any key related information which can be used to this effect may be employed. It is to be understood that the key related information is not decryptor authorization control information per se, but provides an index into decryptor authorization logic functions associated with the associated key pair and maintained at the KRA.

In the above described embodiments a decryptor identifier supplied by the decryptor is used by the key release agent to make key release decisions. More generally, any decryptor information upon which such a decision may be made may be employed. For example, the decryptor information may be a role or capability or rank. The detailed decryptor information may be stored separately, for example in a certificate repository, in which case a decryptor identifier would be used to determine which certificate to obtain. Alternatively, a certificate could be provided with a key release request.

In the above described embodiment, the decryption key is encrypted for the decryptor and sent back to the decryptor. Alternatively, if a secure channel to the decryptor is available, the key could be sent over the secure channel eliminating the need to encrypt the decryption key. Also, in the event the KRA does not encrypt the key using a public key of the requestor, the KRA preferably has some mechanism to ensure that a false decryptor ID is not provided. Secure channels also provide a mechanism of realizing this assurance.

When the KRA re-encrypts a key using the decryptor's public key, the KRA does not strictly require that the requestor be strongly authenticated. For example, there is no requirement to determine proof of possession of the requestor's corresponding private key. This reduces the load on the KRA and allows for better scalability since the number of cryptographic operations is minimized.

Another embodiment of the invention provides an administrative interface for maintaining the private key repository and the rules repository. This interface has a private key repository maintenance function adapted to allow adding and deleting of a key related information and associated private key of a {public key, private key} pair. The interface also has a rule definition function (more generally a decryptor authorization logic definition function) adapted to allow the definition of rules to be applied to decryptor information to determine eligibility to decrypt, and for each rule to select one or more of the key related information in respect of which the rule is to be applied. An administrative interface may store the key related information and associated private key of a {public key, private key} pair in association with one of a plurality of access identifiers. The rule definition function stores each rule in association with one of the plurality of access identifiers.

Numerous modifications and variations of the present invention are possible in light of the above teachings. It is therefore to be understood that within the scope of the appended claims, the invention may be practised otherwise than as specifically described herein.

We claim:

1. A key release method comprising:
    receiving a key ciphertext and key related information in respect of a key used to encrypt the key ciphertext from a decryptor;
    locating decryptor authorization logic stored externally to the decryptor with use of the key related information;
    obtaining decryptor information in respect of the decryptor;
    deciding based on the decryptor information and the decryptor authorization logic whether decryption of the key ciphertext is to be permitted.

2. A method according to claim 1 wherein the decryptor information is received from the decryptor together with the key ciphertext and key related information.

3. A method according to claim 1 wherein obtaining decryptor information comprises receiving the decryptor information while establishing a secure connection with the decryptor.

4. A method according to claim 1 wherein obtaining decryptor information comprises:
    receiving from the decryptor a decryptor identifier;
    using the decryptor identifier to lookup decryptor attributes from a public repository, the decryptor identifier and decryptor attributes together constituting the decryptor information.

5. A method according to claim 1 further comprising:
    using information in a certificate as the decryptor information.

6. A method according to claim 5 further comprising:
    obtaining the certificate from a certificate repository.

7. A method according to claim 5 further comprising receiving the certificate together with the key ciphertext and key related information.

8. A method according to claim 1 wherein the decryptor information is an identity or role of the decryptor, an alias, or a claim of access rights or privilege, or some other attribute of the decryptor of a corresponding decrypting device or platform.

9. A method according to claim 1 wherein the key related information comprises a key pair identifier.

10. A method according to claim 1 further comprising:
    decrypting the key ciphertext, re-encrypting the key using a public key of a {public key, private key} pair to produce a re-encrypted key, the private key of which is available to the decryptor, and sending the re-encrypted key to the decryptor.

11. A method according to claim 1 further comprising:
    decrypting the key ciphertext to obtain a decryption key;
    sending the decryption key to the decryptor over a secure channel.

12. A method according to claim 1 further comprising:
    decrypting the key ciphertext to obtain a decryption key;
    using a symmetric key available to the decryptor, encrypting the decryption key with the symmetric key to produce an encrypted decryption key, and sending the encrypted decryption key to the decryptor.

13. A method according to claim 1 further comprising:
    receiving a plurality of key ciphertexts and respective key related information from the decryptor and determining whether at least one private key required to decrypt a respective at least one key ciphertext of the plurality of key ciphertexts is available;

using the respective key related information to locate respective decryptor authorization logic stored externally to the decryptor; and upon determining such at least one private key is available, deciding based on the decryptor information and the respective decryptor authorization logic whether decryption eat least one of the plurality of key ciphertexts is to be permitted.

14. A method to claim 13 further comprising:

decrypting one of the key ciphertexts using a corresponding private key to recover a decryption key.

15. A method according to claim 13 wherein deciding based on decryptor information of the decryptor and the respective decryptor authorization logic whether decryption of at least one of the key ciphertexts is to be permitted comprises applying the respective decryptor authorization logic associated with each public key used to encrypt the decryption key to the decryptor information to determine whether the decryptor should be permitted access to the decryption key.

16. A method according to claim 1 wherein deciding based on decryptor information of the decryptor and the decryptor authorization logic whether decryption of the key ciphertext is to be permitted comprises applying at least one rule of the decryptor authorization logic associated with the public key used to encrypt the decryption key to the decryptor information to determine whether the decryptor should be permitted access to the decryption key.

17. A method of controlling access to a decryption key comprising:

receiving from a decryptor a key release request comprising decryptor information and the decryption key encrypted using a public key;

locating decryption authorization logic stored externally to the key release request with use of the public key;

applying the decryption authorization logic to the decryptor information to determine whether the decryptor should be permitted access to the decryption key;

upon determining the decryptor should be permitted access to the decryption key, sending a key release response specifying the decryption key.

18. A method of controlling access to decryption keys comprising:

maintaining a private key repository comprising a plurality of access identifiers, and for each access identifier at least one key related information or a respective {public key, private key} pair, the repository also containing the private key of each {public key, private key} pair;

receiving a key release request containing a decryption key encrypted using a public key of a {public key, private key} pair anti containing a key related information associated with the {public key, private key} pair;

maintaining a repository residing externally to the key release request associating each access identifier with respective decryptor authorization logic that can be applied to a decryptor information;

obtaining decryptor information;

for each access identifier in association with which the key related information is stored, applying the respective decryptor authorization logic to the decryptor information specified in the key release request;

in the event the decryptor information satisfies at least one of the respective decryptor authorization logics, decrypting the ciphertext to recover the decryption key, and sending a key release response to the decryptor specifying the decryption key.

19. A key release agent comprising:

means for receiving from a decryptor a key ciphertext and key related information in respect of a key used to encrypt the key ciphertext;

means for locating decryptor authorization logic stored externally to the decryptor with use of the key related information;

means for obtaining decryptor information in respect of the decryptor; and means for deciding based on decryptor information of the decryptor and the decryptor authorization logic whether decryption of the key ciphertext is to be permitted.

20. A key release agent according to claim 19 adapted to receive the decryptor information together with the key ciphertext all key related information.

21. A key release agent according to claim 19 adapted to use a decryptor identifier to lookup decryptor attributes from a repository, the decryptor identifier and decryptor attributes together constituting the decryptor information.

22. A key release agent according to claim 19 further comprising:

decrypting means for decrypting the key ciphertext;

encryption means for re-encrypting the key using a public key of a {public key, private key} pair to produce a re-encrypted key, the private key of which is available to the decryptor;

means for sending the re-encrypted key to the decryptor.

23. A key release agent a cording to claim 19 further comprising:

means for applying decryptor authorization logic associated with each public key used to encrypt the decryption key to the decryption information for determining whether the decryptor should be permitted access to the decryption key.

* * * * *

UNITED STATES PATENT AND TRADEMARK OFFICE
CERTIFICATE OF CORRECTION

PATENT NO. : 8,161,565 B1
APPLICATION NO. : 09/746015
DATED : April 17, 2012
INVENTOR(S) : Glenn Langford Page 1 of 1

It is certified that error appears in the above-identified patent and that said Letters Patent is hereby corrected as shown below:

In the Claims:

Column 11, claim 13, line 9, "…decryption eat least one of the plurality of key cipher…" should be --…decryption of at least one of the plurality of key cipher…--;
Column 11, claim 18, line 48, "…least one key related information or a respective {public…" should be --…least one key related information of a respective {public…--;
Column 12, claim 18, line 1, "…key} paid anti containing a key related information assoc…" should be --…key} paid and containing a key related information assoc…--;
Column 12, claim 20, line 31, "…ciphertext all key related information…" should be --…ciphertext and key related information…--;
Column 12, claim 23, line 44, "A key release agent a cording to claim 19 further com…" should be --A key release agent according to claim 19 further com…--; and
Column 12, claim 23, line 48, "…key to the decryption information for determining…" should be --…key to the decryptor information for determining…--.

Signed and Sealed this
Fourth Day of September, 2012

David J. Kappos
*Director of the United States Patent and Trademark Office*